United States Patent [19]
Stockburger et al.

[11] Patent Number: 5,429,885
[45] Date of Patent: Jul. 4, 1995

[54] HYDROGEN MANAGEMENT SYSTEM FOR METAL/AIR FUEL CELL

[75] Inventors: Dorothy Stockburger, Kingston; Jim Tregenza, Village, both of Canada

[73] Assignee: Yardney Technical Products, Inc., Pawcatuck, Conn.

[21] Appl. No.: 156,267

[22] Filed: Nov. 22, 1993

[51] Int. Cl.⁶ .............................................. H01M 8/06
[52] U.S. Cl. ........................................ 429/13; 429/22; 429/27; 429/58
[58] Field of Search .................. 429/13, 22, 27, 57, 429/58

[56] References Cited

U.S. PATENT DOCUMENTS

| | | | |
|---|---|---|---|
| 3,840,403 | 10/1974 | George et al. | 136/6 |
| 4,735,872 | 4/1988 | Maimoni | 429/27 |
| 4,994,332 | 2/1991 | Coin et al. | 429/27 |
| 5,156,925 | 10/1992 | Lapp | 429/19 |

FOREIGN PATENT DOCUMENTS

| | | | |
|---|---|---|---|
| 0312766B1 | 9/1992 | European Pat. Off. | |
| 59-149664 | 8/1984 | Japan | 429/22 |
| 59-149665 | 8/1984 | Japan | 429/22 |

OTHER PUBLICATIONS

D. Gibbons and K. Gregg, ELTECH Research Corporation, "Closed Cycle Aluminum/Oxygen Fuel Cell with Increased Mission Duration", 1992 IEEE (month unknown) 35th International Power Sources Symposium: Hyatt Cherry Hill, Cherry Hill, N.J., Jun. 22-25, 1992, p. 405.

Primary Examiner—Stephen Kalafut
Attorney, Agent, or Firm—Cooper and Dunham

[57] ABSTRACT

A process for controlling the hydrogen that evolves as a parasitic by-product during the operation of a metal/air fuel cell which comprises feeding into a catalytic recombiner a gaseous stream containing hydrogen being discharged from the metal/air cell together with an amount of oxygen sufficient to convert the hydrogen to water, said oxygen gas concentration being monitored and adjusted to maintain an oxygen concentration in the gaseous stream entering the recombiner in the range of 1.5 to 2.5% by volume. The process is of particular value in closed system aluminum/oxygen fuel cells in which small amounts of hydrogen must be removed, e.g. the sealed hull of an underwater vehicle.

6 Claims, 3 Drawing Sheets

HYDROGEN MANAGEMENT SYSTEM FOR METAL/AIR FUEL CELL

BACKGROUND OF THE INVENTION

The invention relates to metal/air fuel cells, and particularly to a hydrogen management system for closed system aluminum/air fuel cells.

Metal/air fuel cells or batteries produce electricity by the electro-chemical coupling of a reactive metallic anode to an air cathode through a suitable electrolyte in a cell. The air cathode is typically a sheet-like member, having opposite surfaces respectively exposed to air and to the aqueous electrolyte of the cell. During cell operation, oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added dissociation-promoting catalyst) in association with a finely divided hydrophobic polymeric material and incorporating a metal screen as the conductive element. A variety of anode metals have been used or proposed; among them, zinc, alloys of aluminum and alloys of magnesium are considered especially advantageous for particular applications, owing to their low cost, light weight and ability to function as anodes in metal/air fuel cells using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface. A typical fuel cell unit or battery comprises a plurality of such cells.

Aqueous electrolytes for metal-air fuel cells consist of two basic types, namely a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

When a metal/air fuel cell is operated, quantities of hydrogen gas form as a parasitic by-product from the surface of the anode. As with other fuel cells or batteries this hydrogen can reach explosive concentrations.

Lapp U.S. Pat. No. 5,156,925 issued Oct. 20, 1992 describes a metal/air fuel cell in which hydrogen is collected and removed from a cell stack and discharged to the atmosphere. That system was intended for use in motorized vehicles and there was no problem in venting the small quantities of hydrogen to the atmosphere. It was only important to keep the hydrogen level in the fuel cell, vehicle and vehicle surroundings below the flammable limit of about 4% by volume.

However, when metal/air fuel cells must be used in a closed system where the hydrogen gas cannot easily be vented, it is necessary to convert excess hydrogen preferably to water. An example of a closed system is where the fuel cell is used as a power source in an unmanned underwater vehicle (UUV).

In a paper by Gibbons et al, "Closed Cycle Aluminum/Oxygen Fuel Cell With Increased Mission Duration" presented at the Power Sources Conference at in 1993, a system is described in which the hydrogen passing into a catalytic recombiner is maintained at a concentration of less than 3%. This is accomplished by employing oxygen as a carrier gas. However, there is no mention of what level of oxygen is used or how this level is maintained.

In George et al, U.S. Pat. No. 3,840,403 issued Oct. 8, 1974, a battery is described using a recombiner where the stoichiometric excess of one gas is stored for a period of time until a stoichiometric excess of the other gas is available for reacting with it to form water.

European Patent Publication 0 312 766 P1 published Sep. 2, 1992 describes a procedure in which the gas remaining after recombination is converted electrochemically at a gas consumable electrode.

It is an object of the present invention to provide a simplified chemical recombination process for combining oxygen gas with the excess hydrogen gas to form water.

SUMMARY OF THE INVENTION

The present invention in its broadest aspect relates to a method for controlling the hydrogen that evolves as a parasitic by-product during the operation of a metal/air fuel cell. In the method, there are fed into a catalytic recombiner vessel a gaseous discharge containing hydrogen which is discharged from a metal/air cell together with an amount of oxygen sufficient to convert the hydrogen to water. The oxygen gas flow is monitored and adjusted to maintain an oxygen concentration in the gas entering the recombiner in the range of 1.5 to 2.5% by volume.

The oxygen concentration of 1.5 to 2.5% has been found to be particularly suitable since any hydrogen surges can easily be accommodated by this concentration and it is also well below the 5% oxygen that will support combustion with hydrogen.

For carrying out the method, an oxygen sensor continually monitors the gas stream entering the recombiner and operates a control valve to add oxygen as required to bring the level up to the desired range of 1.5 to 2.5%.

As stated above, the oxygen is added to the gaseous stream sufficient to maintain the concentration of oxygen at 1.5 to 2.5% by volume. The amount of oxygen which is added is equal to the amount which has been consumed in the hydrogen recombination reaction. By maintaining a steady state concentration of oxygen, the system is capable of reacting quickly to sudden increases in hydrogen without having to actually supply more oxygen.

The entire fuel cell can be operated while enclosed in a sealed vessel, such as the sealed hull of an underwater vehicle. In addition to oxygen, hydrogen and water vapour, the only other gas that is present is nitrogen. Just prior to sealing, the hull is flushed with nitrogen. As these gases leave the recombiner, they move into the hull cavity and are eventually drawn back into the system through an opening in the manifold. The 2% oxygen is far in excess of the amount needed by the recombiner to produce water. Typically, 8 l/min $O_2$ and 1 l/min $H_2$ will enter the recombiner. Assuming that all the $H_2$ is converted to $H_2O$, this leaves 7.5 l/min of $O_2$ to enter the hull and be drawn back into the manifold. On passing by the oxygen sensor just prior to entering the recombiner again, 0.5 l/min $O_2$ is added to the gas stream to bring the $O_2$ level back up to 8 l/min.

The process of this invention has been found to eliminate more than 96% of the stray hydrogen within a sealed underwater vessel. The system is operated in primarily a nitrogen atmosphere. However, sufficient oxygen is introduced to recombine most of the hydrogen, maintaining gas concentrations well below explosive and flammable limits for hydrogen in oxygen.

The control system of this invention is unique in that the amount of oxygen delivered to the recombiner is a function of the oxygen concentration in the gas stream entering the recombiner rather than the recombination reaction stoichiometry between the hydrogen and oxygen. It provides the advantages that (a) a buffer volume of oxygen is always present which is able to handle small hydrogen variations faster than possible by the sensor response or control while maintaining low hydrogen concentrations in the hull and (b) control is based on a single variable, i.e. oxygen alone, resulting in a very stable system.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENTS

Figure 1:
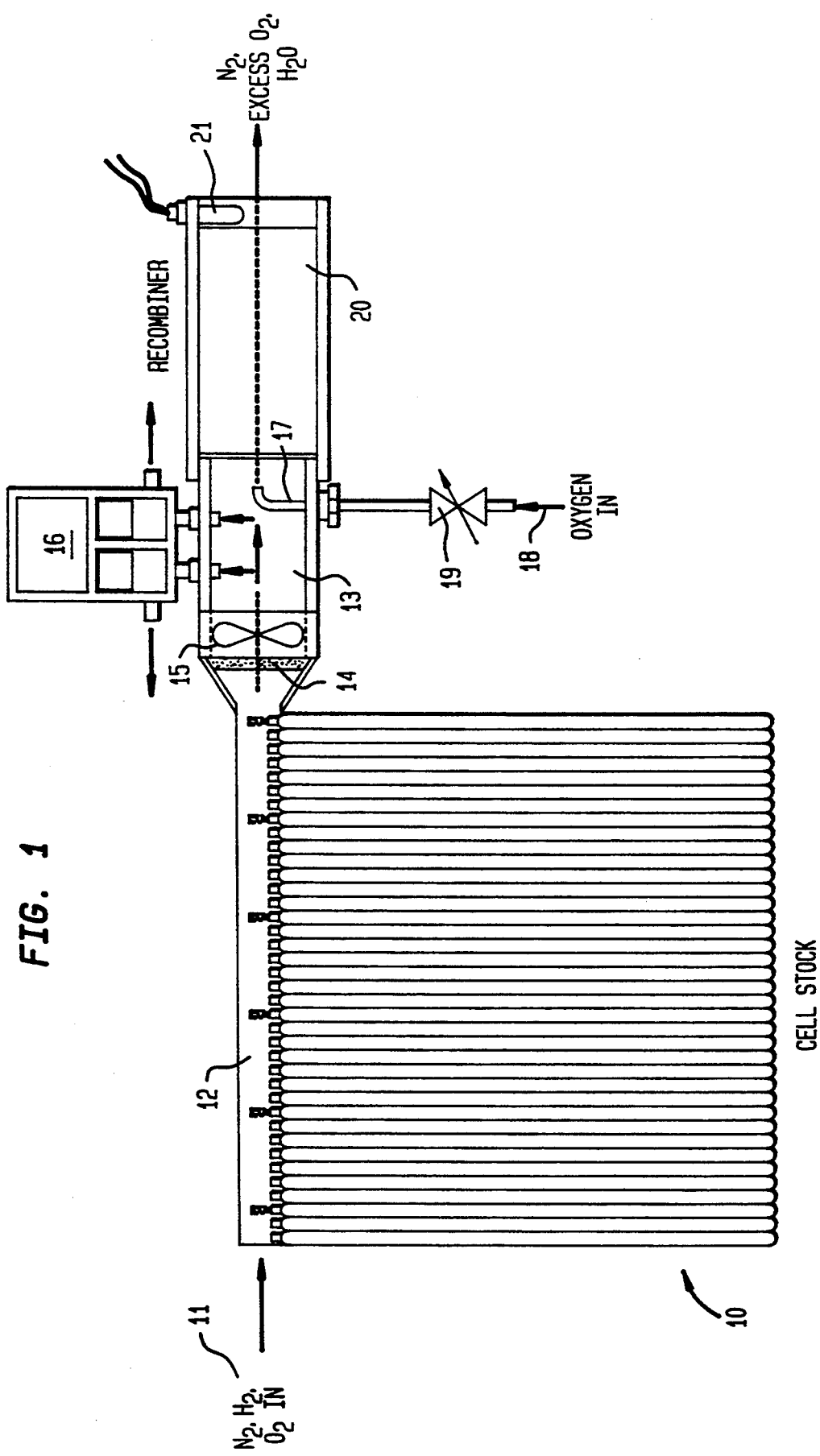
FIG. 1 is a schematic illustration of a preferred embodiment of the invention.

Turning to FIG. 1, a cell stack 10 is shown for a typical aluminum/air fuel cell such as that described in U.S. Pat. No. 5,156,925, incorporated herein by reference. At the top of the cell stack 10 is a gap 12 which receives the hydrogen produced by the cell stack and through which passes a mixture of nitrogen, hydrogen and oxygen 11. The gaseous mixture containing excess hydrogen is drawn through filter 14 by means of fan 15 and into collector vessel 13. Flow connected to the collector vessel 13 is an electronic sensor 16 for sensing oxygen concentration of the gas in the collector 13.

Oxygen is fed into the collector vessel 13 through inlet 17. The oxygen is fed from an external source via inlet 18 and through control valve 19. The flow through the control valve 19 is controlled by the electronic sensor 16 such as to maintain the concentration of oxygen within the collector vessel at a level of 1.5 to 2.5% by volume.

This gaseous mixture proceeds into the recombiner 20 where the hydrogen reacts with the excess oxygen in the presence of a palladium catalyst to form water. The temperature of the gas emerging from the recombiner is monitored by means of the temperature sensor 21.

The system of the present invention was tested in a laboratory system designed to simulate underwater environment, with a sealed hull section having a pumped water jacket for representative seawater heat transfer conditions. Benchtop computers and instrumentation, a nitrogen purge system and oxygen storage and supply system were all outside the hull environment.

Figure 2:
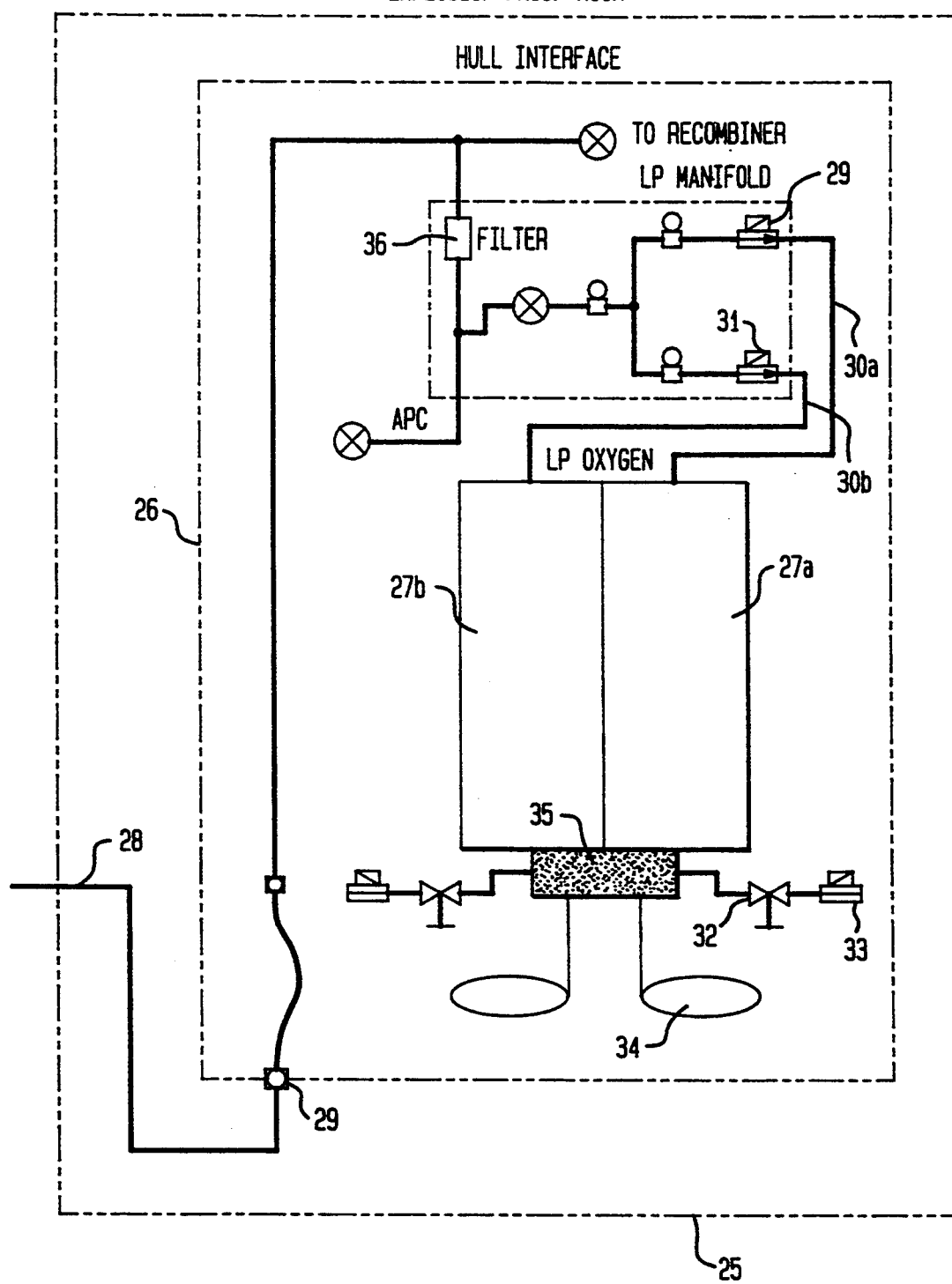
FIG. 2 is a schematic illustration of an oxygen system for a test unit.

As will be seen from FIG. 2, the system is placed within an explosion proof room 25 with an inner casing 26 representing a hull interface. The power source consists of a monobloc having 68 cells in two parallel banks 27a and 27b of 34 cells each.

Oxygen is supplied via line 28 and hull interface connector 29 from an external high pressure oxygen bottle. The oxygen is regulated down to the system intermediate pressure of 30 psi. The oxygen line 28 is connected to a manifold 29 with the oxygen passing through a filter 36. After filtering, the oxygen flow is divided into two streams 30a and 30b with control valves 31. The oxygen from lines 30a and 30b then proceeds to the power source.

The outlet from the cell banks 27a and 27b include gas/liquid separators 35 with liquid collectors 34 and gas discharges through control valves 33. The discharges also includes adjustable bleed orifices 32.

Figure 3:
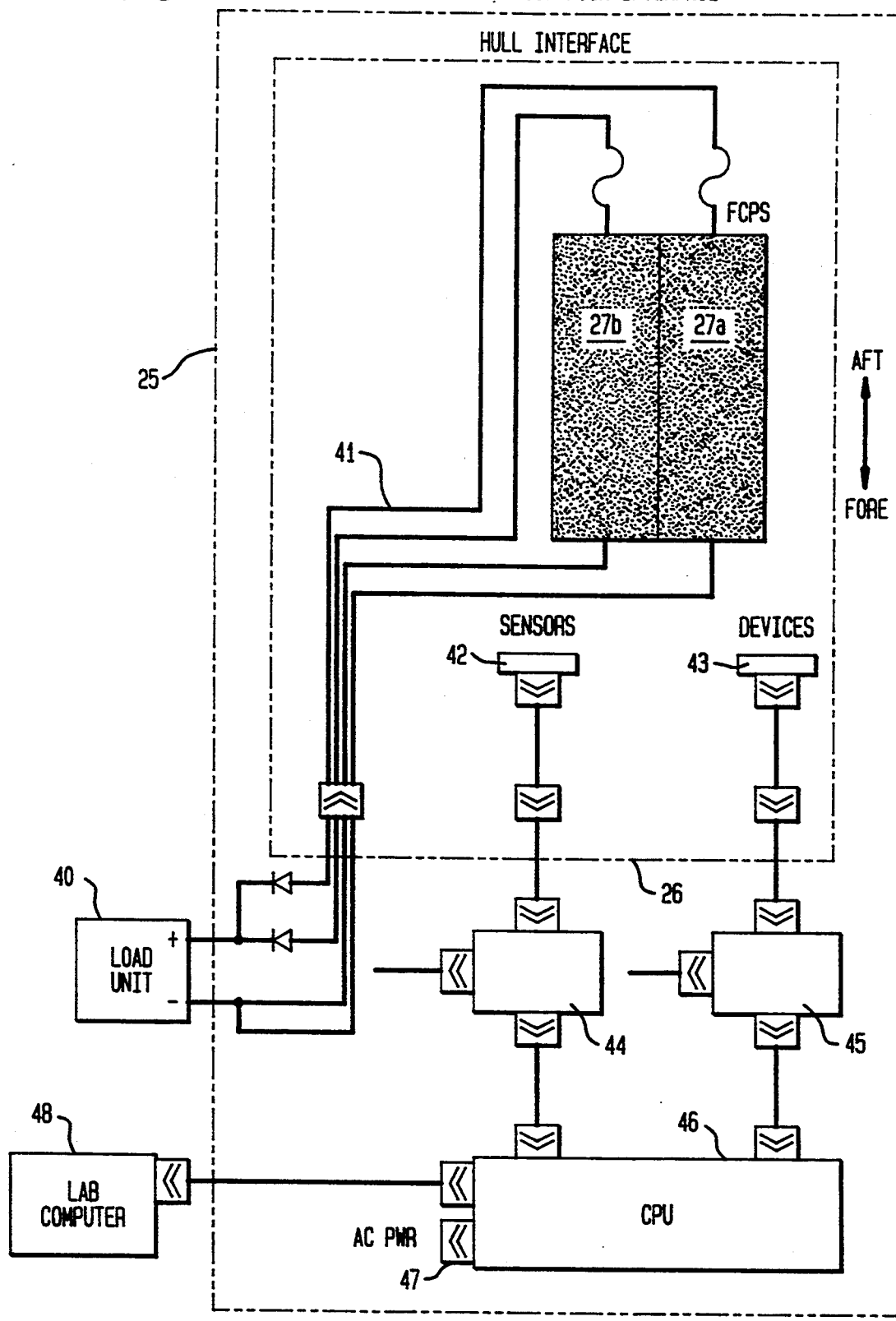
FIG. 3 is a block diagram for an electrical system for a test unit.

The electronic control system as shown in FIG. 3 includes a load unit 40 with connectors 41 to cell banks 27a and 27b.

The system also includes sensors 42 and devices 43 connected to a sensor signal conditioning/termination rack 44 and a digital control rack 45 respectively. These are conducted to a CPU 46 having an AC power input 47 with an output to a lab computer 48.

EXAMPLE 1

Tests simulating a system as shown in FIG. 1 were carried out. Hydrogen production from a cell stack consisting of a monobloc with 68 cells in two parallel banks of 34 cells and KOH as electrolyte was simulated by adding hydrogen directly into a control volume, having a "free" volume similar to that of the underwater vehicle hull. The percentage of oxygen in control volume (referred to hereinafter as "hull") was chosen to be the controlled variable and this was controlled by (a) an on/off control and (b) a proportional control. The objective was to replenish oxygen at the rate at which it is being consumed thus maintaining a constant hull oxygen concentration. In terms of the hull hydrogen concentration, it is desirable to maintain the hull concentration as close to zero as possible.

To determine the effectiveness of each control technique, the system was disturbed by either sharply increasing or decreasing the hydrogen inlet flow rate. The procedure followed for each control strategy is described below:

1) Implementation of control strategy.
2) Introduce a positive step change (+3 Lpm) in the hydrogen inlet flowrate.
3) Measure the overshoot and steady state hull and manifold hydrogen and oxygen concentrations.
4) Introduce a negative step change (−0.3 Lpm) in the hydrogen inlet flowrate.
5) Measure the overshoot and steady state hull and manifold hydrogen and oxygen concentrations.

Steps 1 to 5 were repeated for a variety of control gains and setpoints.

The effectiveness of the control strategy was evaluated in terms of the overshoot and steady state offset measured for the hull hydrogen and oxygen concentrations after a step input of hydrogen. The overshoot was taken to be the maximum deviation from the setpoint measured immediately after the step change. The steady state offset was the deviation from the setpoint measured once the system reached a new steady state. An effective control strategy is seen to be one which minimizes both.

(A) On/Off Control

On/off control of the hull oxygen concentration was used to control the oxygen supplied to the recombiner. In these tests, no disturbances were introduced into the system. The results obtained are shown in Table 1 below:

and 1%. It was found that there was negligible overshoot or steady state offset measured in the hull hydrogen concentration during this series of tests. The hull oxygen concentration overshoot and steady state offset for positive and negative step changes in hydrogen as a function of the offset and the gain is shown in the following Table 2.

TABLE 2

| Feedback | Setpoint | Gain | Step Input H₂ Lpm | Overshoot Hull | | S.S. Offset Hull | |
|---|---|---|---|---|---|---|---|
| | | | | O₂ % | H₂ % | O₂ % | H₂ % |
| Hull O₂ % | 2% | 3 | +3 | −1.2 | 0 | 0.9 | 0 |
| | | | −.3 | +0.1 | 0 | −0.1 | +0.02+ |
| | | 6 | +3 | −0.8 | 0 | −0.5 | 0 |
| | | | −.3 | +0.4 | 0 | −0.1 | +0.02+ |
| | | 8 | +3 | −0.6 | 0 | −0.2-0.6 | 0 |
| | | | −.3 | +0.8 | 0 | −0.1 | +0.02 |
| | 1.5% | 3 | +3 | −1.3 | 0 | −1 | 0 |
| | | | −.3 | +0.15 | — | −0.05 | +0.002 |
| | | 6 | +3 | −0.5 | 0 | −0.5 | 0 |
| | | | −.3 | +0.35 | — | −0.1 | +0.008 |
| | | 8 | +3 | −0.7 | 0 | −0.7 | 0 |
| | | | −.3 | +0.2 | — | +/−0.07 | +0.008 |
| | 1% | 3 | +3 | −1.0 | 0 | −1 | 0 |
| | | | −.3 | +0.1 | 0 | −0.1 | ? |
| | | 6 | +3 | −0.8 | 0 | −0.5 | 0 |
| | | | −.3 | +0.5 | 0 | −0.1 | ? |
| | | 8 | +3 | −0.7 | 0 | −0.6 | 0 |
| | | | −.3 | +0.9 | 0 | ? | ? |

Tests were also carried out which employed feedback of $(H_2 - x(O_2 - y))$ which incorporates both the hydro-

TABLE 1

| Feedback | Setpoint | Gain | Step Input H₂ Lpm | Overshoot Hull | | S.S. Offset Hull | |
|---|---|---|---|---|---|---|---|
| | | | | O₂ % | H₂ % | O₂ % | H₂ % |
| Hull O₂ % | 2% | 1000 | +3 | +3.3 | | +/−0.5 | +0.6 |
| | | | −.3 | | | +1->1.5 | |
| Hull O₂ % | 1% | 1000 | +3 | +2.0 | +0.1 | +1.0 | +0.02 |
| | | | −.3 | | | | |

The above table illustrates the hull oxygen overshoot in steady state offset measured for positive and negative step changes at setpoints of 2% and 1% respectively. The hull hydrogen overshoot and offset measured during the on/off tests were very small. However, the hull oxygen steady state lo concentration was found to be highly oscillatory especially at low hydrogen inlet rates. This is undesirable as it also results in regular oscillations in hull pressure.

(B) Proportional Control

This series of tests evaluated the control strategy in which the hull oxygen concentration is maintained above 0% using proportion control instead of on/off control. Three setpoints were evaluated—2%, 1.5% gen and oxygen concentrations at the recombiner inlet into the oxygen control strategy. For the most part in these tests, a value of x=2 was used as this accounts for the reaction stoichiometry of the hydrogen and oxygen at the recombiner. The y value defines the hull oxygen concentration setpoint.

Tabulated values for the overshoot and steady state offset can be found in the following Table 3.

TABLE 3

| Feedback | Setpoint | Gain | Step Input H₂ Lpm | Overshoot Hull | | S.S. Offset Hull | |
|---|---|---|---|---|---|---|---|
| | | | | O₂ % | H₂ % | O₂ % | H₂ % |
| (H₂-2O₂) | O₂ % = 0 | −3 | +3 | +1.4 | +1.0 | +0.3 | 0 |
| | | | −.3 | +1.0 | 0 | −0.15 | 0 |
| | | −4 | +3 | +1.5 | +0.8 | +0.8 | +0.3 |
| | | | −.3 | +0.9 | 0 | +0.1 | 0 |
| | | −5 | +3 | +1.2 | +1.0 | +0.8 | +0.3 |
| | | | −.3 | +1.4 | 0 | +0.2 | 0 |
| | | −2 | +3 | 0 | +2.5 | — | — |
| (H₂-2(O₂-2)) | O₂ % = 2 | −3 | +3 | −0.6 | 0 | +0.2 | 0 |
| | | | −.3 | +0.6 | — | +0.1 | 0 |
| (H₂-(O₂-1.5)) | O₂ % = 1.5 | −6 | +3 | −0.5 | 0 | +0.5 | 0 |
| (H₂-2(O₂-1.5)) | | −6 | +3 | −0.7 | 0 | ? | 0 |
| | | | −.3 | +1.5 | 0 | ? | 0 |

Each of the control strategies investigated was evaluated in terms of the following elements: (a) overshoot and steady state offset and (b) equipment requirements.

The recombiner oxygen control characterization tests were undertaken to define a method of control for the oxygen supply to the recombiner which result in a stable system with hull oxygen and hydrogen concentrations maintained at safe limits during all modes of operation. The effectiveness of each control strategy tested was measured in terms of the hull hydrogen and oxygen overshoot and steady state offset resulting from a positive or negative step change in hydrogen inlet rate.

It was found that generally proportional control of the hull oxygen concentration between 1 and 2% was most effective in minimizing the hull hydrogen and oxygen overshoot and steady state offset. From this group, a hull oxygen setpoint of 1.5% with a gain of 6 was seen to be the most promising in terms of the response to a step change and the hull gas concentrations at a steady state.

The control strategy employing a feedback was desirable from a safety point of view because the amount of oxygen supplied to the recombiner reflects on the reaction stoichiometry at the recombiner. This resulted in a steady state hull hydrogen gas content very close to zero.

On/off control was not as effective as proportional control of the hull oxygen concentration. This is due to the oscillation of the oxygen concentration in the hull at steady state when on/off control is used.

EXAMPLE 2

Tests were conducted using the system of FIGS. 2 and 3. The cells were filled with 4.5 molar KOH, 0.01 molar sodium stannate electrolyte formulation with a volume of 600 ml per cell. During filling, a small load of approximately 4 amps total was applied to the cell stacks to control anode hyperactivation.

After the cells were filled, porous plastic filters were installed and thermistor probes were installed starting at every third cell from either end of any bank and every eighth cell thereafter. As part of this test, hydrogen-/oxygen measurements were made from the hydrogen vent port and from the oxygen manifold.

The system was operated for 61 hours on automatic control with a hull oxygen concentration of 2%±0.5%. Under normal operation of the system, the following characteristics were observed.

Stack voltage: >44 VDC
Hull hydrogen conc.: <0.5%
Hull pressure: >12 psia and <17 psia
Hull temp: <50° C.
Aug. bank temperatures: >55° C. and <65° C.
Stack low pressure supply: >4.0"$H_2O$

We claim:

1. A process for controlling the hydrogen that evolves as a parasitic by-product during the operation of a metal/oxygen fuel cell which comprises feeding into a catalytic recombiner a gaseous stream containing hydrogen being discharged from the metal/oxygen cell together with an amount of oxygen sufficient to convert the hydrogen to water, said oxygen gas concentration being monitored and adjusted to maintain an oxygen concentration in the gaseous stream entering the recombiner in the range of 1.5 to 2.5% by volume and in excess of the stoichiometric amount required to react with said hydrogen.

2. The process according to claim 1 wherein the fuel cell is an aluminum/oxygen cell.

3. The process according to claim 2 wherein the oxygen flow into the recombiner is continuously adjusted to maintain a concentration in the range of 1.5 to 2.5% by volume.

4. The process according to claim 3 wherein the oxygen flow is controlled by means of a mass flow controller.

5. The process according to claim 2 wherein the metal-oxygen fuel cell is operated within a closed system.

6. The process according to claim 5 wherein the metal-oxygen fuel cell is operated within an unmanned underwater vehicle.

* * * * *